Figure 1:
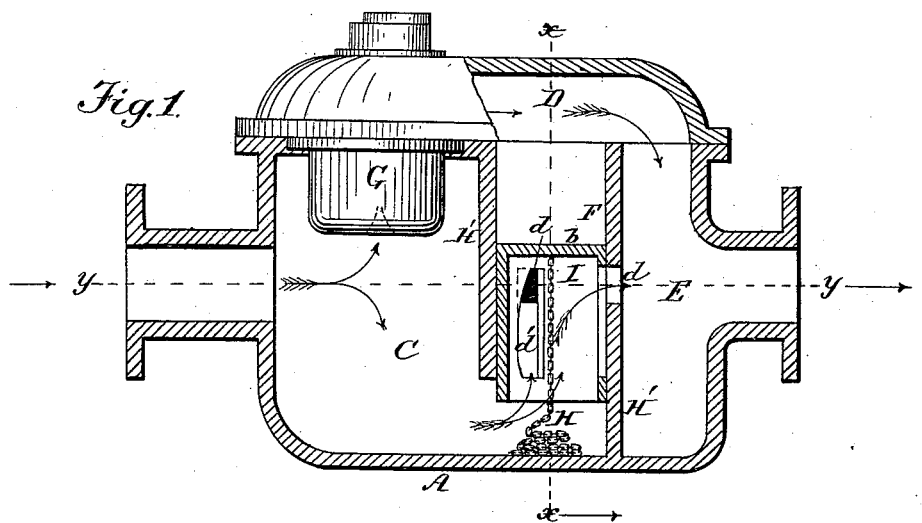

(No Model.)

L. H. NASH.
PROPORTIONAL WATER METER.

No. 336,135. Patented Feb. 16, 1886.

Witnesses:
A. E. Grant
G. E. Tucker

Inventor:
Lewis H. Nash
by Johnson and Johnson
Atty.

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 336,135, dated February 16, 1886.

Application filed June 22, 1885. Serial No. 169,389. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

The meter is constructed to divide the influent volume into two streams, one of which only is measured, so as to represent a given and definite proportion of the entire volume.

In other applications for patents filed by me, under Serial Nos. 163,052 and 163,067, I have described and claimed an organized meter device for carrying out a method of effecting a proportional measurement of a volume divided into separate streams, whereby a great or small capacity of supply is obtained with accuracy of measurement by utilizing the difference between the pressures of the separate flowing streams in their separate chambers by means of a valve controlling the discharge from one chamber operating a variable-speed-controlling mechanism connected with the indicator proportionately to the quantity of water passing in the divided volume, and to give thereby the sum total of the entire volume passing in the metered and non-metered streams.

The object of my present improvement is to obtain the same result without the use of means to alter the speed of the indicating mechanism or any connection of the valve which controls the discharge from the non-metered chamber with the indicator, and to control the discharge from the non-metered chamber in such manner that it will always bear a fixed proportion to the quantity passing through the metered passage, so that the indicator will give the sum total of the entire passing volume under different rates of flow.

In my said applications hereinbefore referred to it was not required that the meter should pass the same quantity of water under all rates of flow, and the variable-speed-controlling mechanism connecting the valve was provided to indicate the varying relation between the quantity of water discharged by the valve from the non-metered chamber under varying conditions of pressure in the two chambers. In such method the valve opened the discharge-ports wider and wider as the quantity of the flow in the non-metered chamber increased, and hence under a large flow this chamber discharged a greater proportional quantity of water than under a less flow.

The subject-matter of this application is the meter constructed with a valve having provision for controlling the discharge from the non-metered passage, so that it shall always bear a fixed proportion to the quantity passing through the metered passage, so as to allow of the flow through the valve-controlled ports in just the required quantity under the different rates of flow, governed under all conditions by the difference of pressure in the two chambers on the opposite side of the valve. To accomplish this, the operation of the valve, in closing and opening the discharge-ports, must differ from that set forth in my said applications. This difference I will now describe in my improved meter in connection with the accompanying drawings, in which—

Figure 3:
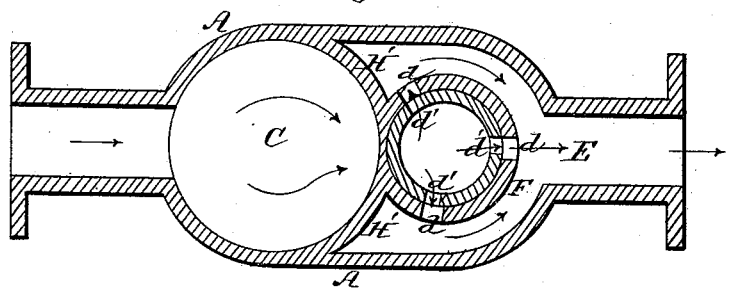
Figure 4:
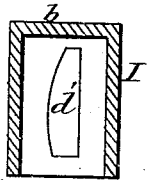
Figure 2:
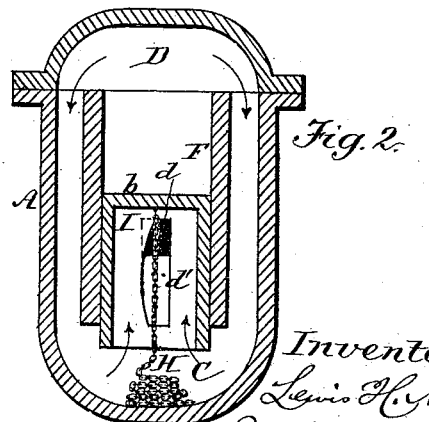

Figure 1 represents a vertical section of a proportional water-meter, showing the indicating device in elevation; Fig. 2, a vertical section of the same on line $x\ x$ of Fig. 1; Fig. 3, a horizontal section of the same on the line $y\ y$, and Fig. 4 a section of the piston-valve.

A is the inclosing-case, divided into a receiving-chamber, C, which I term the "non-metered" passage, a chamber, D, which I term the "metered" passage, and a discharge-chamber, E, which communicates with the chambers C and D. Within the chamber-forming partition H' is placed the meter G, which I have shown in elevation as suspended within the receiving-chamber, and which contains the devices for operating the indicator or dial mechanism. Through this meter a portion of the influent volume passes into the chamber D and is measured. Within this partition H' is also placed the piston-valve for controlling the discharge from the non-metered chamber.

The valve-seat F is a cylinder opening at its ends, respectively, at its top into the chamber D and at its bottom into the chamber C, so that the pressure in both chambers will be exerted on opposite sides of the valve, which operates like a piston. The valve-seat has ports d, through which the water passes from the receiving into the discharging chamber E, as indicated by the arrows.

The valve I is fitted to move freely within its seat, and is preferably of cylindrical form, closed at its upper end, b, and open at its lower end. It has ports $d'$ in its vertical walls, of irregular form and of equal number with the seat-ports, which latter are of regular form, so that the water flowing through the chambers will act by pressure upon the closed-valve end in a manner to cause it to rise and fall by the difference in the pressure of the flowing streams, and thereby operate in connection with its ports and the seat-ports. In this operation it is necessary to cause the valve to have an increasing resistance to its movement under the pressure of the water in the receiving-chamber in order to balance the difference in pressure between the influent and the effluent passages as the valve moves under this pressure. This balancing operation I accomplish by suspending a sectional weight or chain, H, from the closed end of the valve, so that it will rest upon the bottom of the receiving-chamber, and offer more and more resistance to the pressure of the water as it rises under the increased weight. Now, with a valve operating with a variable resistance, it is necessary, in order to control the flow of the water through the receiving-chamber, to provide an operating-valve port which shall automatically make the proper size of opening to allow just the required quantity of water to pass from said chamber. Under very small rates of flow a larger proportion of water will pass through a given-sized port from the receiving-chamber than will pass with a larger flow, and hence this port should be closed by the valve to an extent just sufficient to allow of the passage of the required proportion of water. Under high rates of flow the resistance through the metered passage will be of greater proportion than the flow through the receiving-chamber, and hence the valve should be capable of slightly closing the ports d at the higher rates of flow over the size of port required at the medium rates of flow. It is for this purpose that I form the long valve-ports $d'$ of an irregular form, being of less area at their upper than at their lower ends, so that when the valve is in a lower position, as seen in Fig. 1, the edge or edges of its port at its upper end will overlap the edge or edges of the ports d, so as to close the latter to some extent. As the valve rises, its ports widen so as to increase the discharge-openings until the valve approaches its extreme upper limit, when the discharge-openings will again become smaller, for the purpose above stated.

As the quantity of water discharged by the valve will be a multiple of the volume passing through the metered passage, it is obvious that variations in the flow through the metered passage will be caused by certain difference of pressure between the receiving-chamber and the outlet-chamber, and it is therefore necessary to provide for balancing this difference of pressure to obtain in the two streams an unchanging proportion to each other under all conditions of flow, it being understood that the exact shape of the valve-ports must be determined by actual test for meters of different capacities.

I may use any suitable meter device, G, and arrange it in any suitable way to receive and measure a part of the volume flowing through the chamber C; nor does the method which I have herein described depend upon what I have called a "piston-valve," as I may use other forms of valves adapted to be controlled by the difference of the pressures in the two chambers to control the discharge from one of said chambers in the way and under the conditions which I have stated. The valve-seat may have the irregular ports.

The method which I have herein described of measuring a divided flowing volume of water, the divisions whereof are caused to bear an unchanging proportion to each other under all conditions of flow, by controlling the discharge of one division of the volume so as to allow the flow through the discharge-ports in just the required quantity of water under different rates of flow, is not claimed herein, as such invention is made the subject of a separate application for a patent filed by me of even date herewith.

I claim—

1. The combination, in a water-meter, of an inclosing-case having chambers dividing the influent volume into separate streams, and an indicating device operated by the direct flow of one of said streams to effect its measurement, with a piston-valve having ports $d'$ in its cylindrical walls, formed and arranged to control the discharge from the other chamber by wall-ports d, and a sectional weight suspended from the closed end of said valve, operating to increase the resistance to the movement of the latter under the pressure of the water in the chamber C, to balance the difference in pressure between the influent and the effluent passages, substantially as described.

2. The combination, in a water-measuring device having separate chambers receiving the inflow in separate streams and discharging it in a single volume, of the meter G, containing the indicating operating parts for measuring one of said streams, with a piston-valve having wall-ports $d'$ of irregular form, regulating discharge-ports d of regular form in the division of said chambers, and a sectional weight carried by said piston, substantially as described, for the purpose specified.

In testimony whereof I have hereunto set my hand in the presence of two subscribing witnesses.

LEWIS HALLOCK NASH.

Witnesses:
A. E. H. JOHNSON,
J. W. HAMILTON JOHNSON.